United States Patent [19]

Giuliano

[11] Patent Number: 5,259,297
[45] Date of Patent: Nov. 9, 1993

[54] PROFESSIONAL ESPRESSO COFFEE MAKER FOR BAR-ROOM USE

[75] Inventor: Mario Giuliano, Cuneo, Italy

[73] Assignee: Nuova Faema S.p.A., Milan, Italy

[21] Appl. No.: 847,021

[22] PCT Filed: Oct. 17, 1990

[86] PCT No.: PCT/EP90/01753

§ 371 Date: Apr. 6, 1992

§ 102(e) Date: Apr. 6, 1992

[87] PCT Pub. No.: WO91/07898

PCT Pub. Date: Jun. 13, 1991

[30] Foreign Application Priority Data

Nov. 28, 1989 [IT] Italy .................. 22529 A/89

[51] Int. Cl.⁵ .................................................. A47J 31/24
[52] U.S. Cl. ............................................. 99/282; 99/291; 99/302 R
[58] Field of Search .................... 99/280–283, 99/291, 293–295, 300, 302 R

[56] References Cited

U.S. PATENT DOCUMENTS

| | | | |
|---|---|---|---|
| 1,631,753 | 6/1927 | Midulla | 99/302 R |
| 3,149,556 | 9/1964 | Martin | 99/291 |
| 3,314,357 | 4/1967 | Valente | 99/291 |
| 3,824,914 | 7/1974 | Casiano | 99/302 R |
| 4,565,121 | 1/1986 | Ohya et al. | 99/281 |
| 4,599,937 | 7/1986 | Ghione | 99/302 R |

FOREIGN PATENT DOCUMENTS

| | | | |
|---|---|---|---|
| 11290 | 5/1980 | European Pat. Off. | 99/281 |
| 298547 | 1/1989 | European Pat. Off. | 99/280 |
| 328705 | 8/1989 | European Pat. Off. | 99/280 |
| 347554 | 12/1989 | European Pat. Off. | 99/283 |
| 1916774 | 10/1969 | Fed. Rep. of Germany | |
| 2483762 | 12/1981 | France | 99/280 |
| 2506592 | 12/1982 | France | 99/282 |

Primary Examiner—Harvey C. Hornsby
Assistant Examiner—Mark Spisich
Attorney, Agent, or Firm—Notaro & Michalos

[57] ABSTRACT

A professional espresso coffee maker for preparation of espresso coffee comprises a plurality of dispensing bodies (5) each adapted to receive a percolator holding handle (6). A water heater (22) is connected to each respective dispensing body (5) for instantaneously heating water supplied to the heater and to be supplied from the heater to a percolator holding handle received in the dispensing body. A plurality of steam and hot delivery devices (7, 8, 9, 10) are used with the dispensing body. An electronic control apparatus (2) is connected to the heater for controlling the heater. The water heater (22) is mounted to and over the dispensing body (5) and comprises a solid block (27) of good heat conductive material. The solid block comprises an upper plate (28) and a lower plate (27) connected to the upper plate. The upper plate has an upper surface (28a), a first channel (30) defined in the upper surface of the upper plate, and a resistor (23) in the channel for heating the solid block. The lower plate has an upper surface (29a), a second channel (31) defined in the upper surface of the lower plate, and a coil pipe (24) for passing water through the water heater in the second channel. The lower plate also has a lower surface engaged with the dispensing body.

9 Claims, 3 Drawing Sheets

1

PROFESSIONAL ESPRESSO COFFEE MAKER FOR BAR-ROOM USE

FIELD AND BACKGROUND OF THE INVENTION

This invention relates in general to coffee makers and in particular to a professional "espresso" which is of the type specified.

As is known, coffee makers must perform several different functions. They are expected to prepare a variety of drinks such as black coffee, notably espresso coffee, white coffee or "cappuccino", tea, and punch.

The demand for an ability to have such drinks prepared in a proper, satisfactory manner, especially where espresso coffee and cappuccino are involved for which the consumer is unwilling to accept a quality Less than irreproachable, has resulted in a highly complicated machine construction, particularly with respect to water and steam processing.

Unfortunately, this complex construction results in a difficult machine setting, and hence the likelihood that drinks are delivered, when in actual use which are Less than fully satisfactory.

SUMMARY OF THE INVENTION

The problem that underlies the present invention is to provide a machine which can meet such requirements and at the same time overcome the above-noted deficiencies.

The present invention has been developed from the concept of having the water required for espresso coffee making heated instantaneously and individually.

Based on this concept, in order to solve the above-noted technical problem, the present invention provides a professional espresso coffee maker of the bar-room type.

BRIEF DESCRIPTION O THE DRAWINGS

Further features and the advantages of a machine according to the present invention will be apparent from the following detailed description of a preferred embodiment thereto, given by way of non-Limitative example with reference to the accompanying drawing figures, where:

DESCRIPTION OF THE PREFERRED EMBODIMENTS

Figure 1:
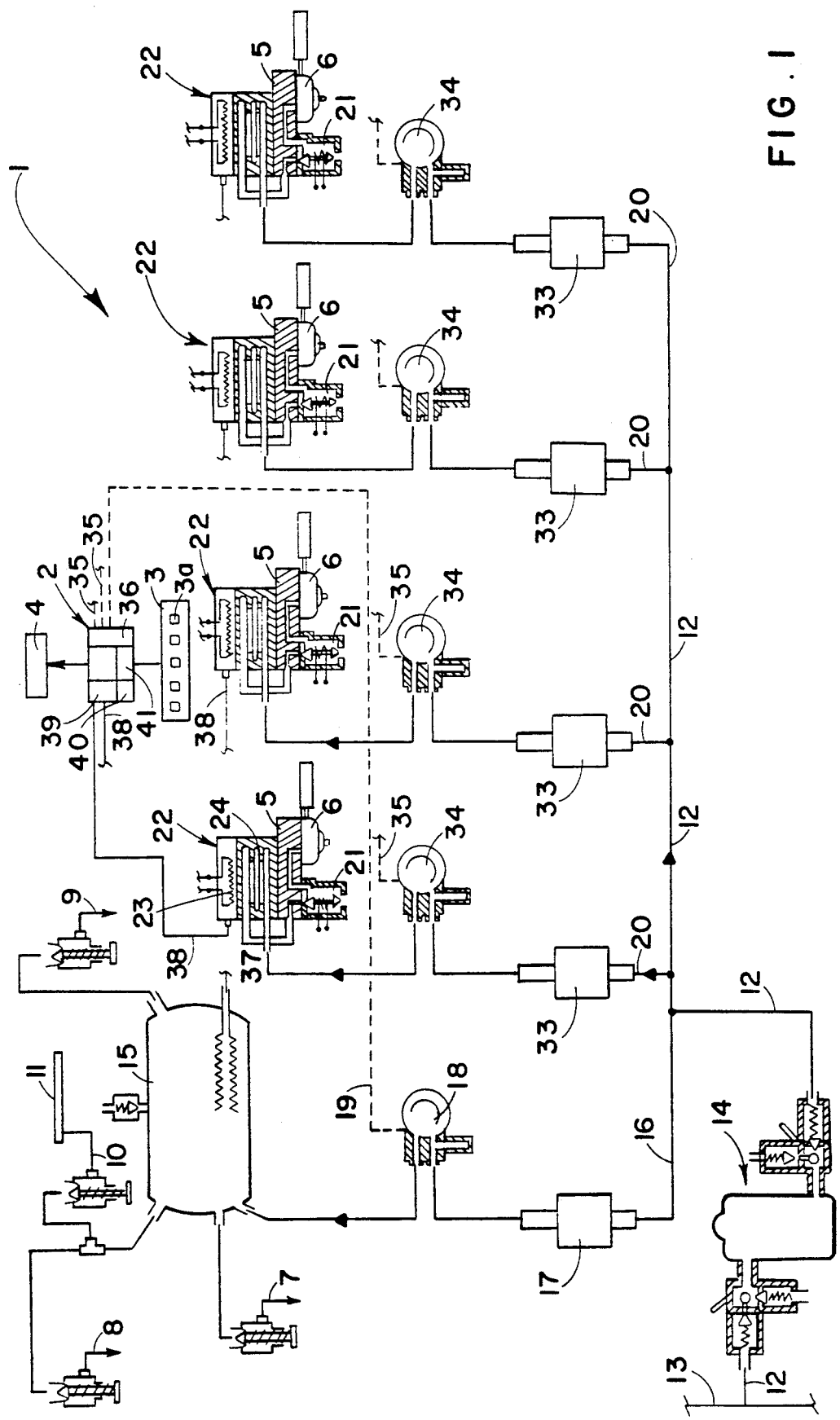
FIG. 1 shows schematically a professional espresso coffee maker for bar-room use, according to the present invention.

With reference to the drawings, as shown in FIG. 1, generally shown at 1 is a professional espresso coffee maker intended for bar-room use.

The coffee maker 1 includes an electronic control apparatus 2 provided with a keyboard 3 having coffee delivery control keys 3a, and a display 4.

The coffee maker 1 further includes a plurality of dispensing bodies, all identical with one another and collectively designated 5, being each adapted to receive, in a detachable manner, a respective a percolator holding handle 6 for the delivery of single-dose espresso coffee.

The machine 1 also includes steam and hot water delivery devices, among which are a hot water delivery nozzle 7 for preparing tea, punch, and the Like, two steam delivery nozzles 8 and 9 for preparing cappuccino, and a nozzle 10 prior delivering steam to a cup heater device 11.

The machine I has a common water feed Line, indicated at 12, which can be connected to a water supply 13 and includes a decalcifying device, generally shown at 14, for softening the supply water.

For supplying the nozzles with water and steam according to necessity, an electrically fired boiler 15 is provided which is connected to the Line 12, downstream from the decalcifying device 14 through a conduit 16 wherein there are connected a pump 17 and a pulsed meter 18, of a relatively small size, such as a metering turbine, which can issue pulses over a Lead 19 in proportional numbers to the amounts of water flowing therethrouah.

Each dispensing body 5 is, connected to the line 12, downstream from this decalcifying device 14, by a respective conduit 20 and is provided with a cut-off solenoid valve 21 for cutting off the water feed to the percolator holding handle 6.

The machine 1 has, for each dispensing body 5, a heater 22 which is associated with the dispensing body 5 to instantaneously and individually heat the water for the fixed handle 6 independently of the other dispensing bodies.

Figure 2:
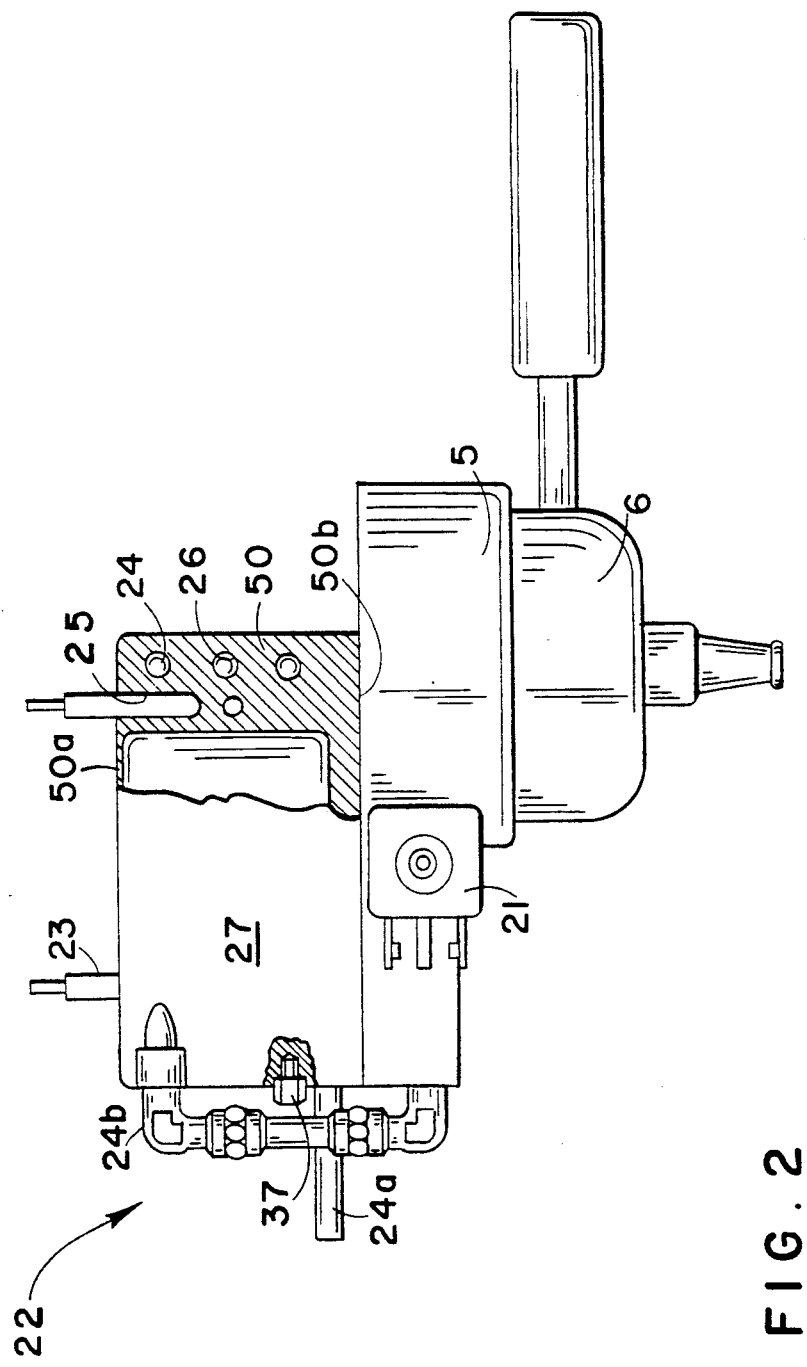
FIG. 2 is a partial sectional, elevation view of a detail of the coffee maker shown in FIG. 1.

Preferably, the heater 22 comprises an electric resistor 23 and a coil pipe 24 formed along the conduit 20. The electric resistor 23 and coil pipe 24 are received along respective paths 25 and 26 formed in a solid block 27 made of a good heat conducting material such as aluminum as shown in FIG. 2.

The block 27 is juxtaposed to the dispensing body 5, and Located above the Latter.

The block 27 is a single casting 50 of aluminum wherein the resistor 23 and coil pipe 24 are embedded.

The single casting 50 has a too face 50a whereat the resistor 23 Locates and a bottom face 50b which is juxtaposed to the dispensing body 5.

The coil pipe 24 his a water inlet 24a which Locates next to the bottom face 50b of the single casting and a water outlet 24b which is located next to a top face 50a.

Referring to FIG. 1, connected in the conduit 20 upstream of the coil pipe 24 are a pump 33 and a pulse meter 34 which supplies, through a a lead 35, pulses in proportional numbers to the amounts of water flowing therethrough.

The electronic apparatus 2 includes a pulse counter unit 36 which is supplied, over the Leads 19 and 35, with the pulses from the meters 18 and 34. The unit 36 computes the total number of pulses emitted by pulse meters 18 and 34 and emits a warning when predetermined total number of pulses have been reached which corresponds to the amount of water when requires replacement of the decalcifying device 14.

Associated with each heater 22 in the machine 1 is a temperature sensor 37, for sensing the water temperature and issuing, over a Lead 38, a signal proportional to the temperature sensed. The electronic apparatus 2 has a storage and comparator unit 39 which is set with predetermined temperature increments or settings, and continuously receives signals proportional to the temperature sensed at sensor 37. Apparatus 2 uses unit 39 to reduce down to zero, the electric power dissipated through the resistor 23 in steps when on the sensed temperature signals reach the desired temperature corresponding to one of the temperature settings.

The sensor 37 is mounted close to the bottom face 50b juxtaposed to the dispensing body.

The electronic control 2 includes a power processing, logic unit 40 that is connected to the storage and comparator unit 39 and monitors dissipated through the boiler 15 and the, possibly reduced, power dissipated through the resistors 23. Unit 40 operates to deactivated the boiler 15 when predetermined total power mark has been reached.

Also provided in the electronic control 2 is an AND-type logic unit 41 for activating the resistor 23 of the heater 22 associated with each dispensing body 5 concurrently with the operation of its respective key 3a in the keyboard 3 for dispensing a dose of espresso coffee.

Preferably, the activation of the resistor 23 of the heater 22 will occur at a reduced power value selected from the temperature increments or settings.

A second embodiment of the block 27 is shown in FIGS. 3, 4, 5 and 6, wherein parts performing the same functions or having the same structures are denoted by the same reference numerals.

Figure 3:
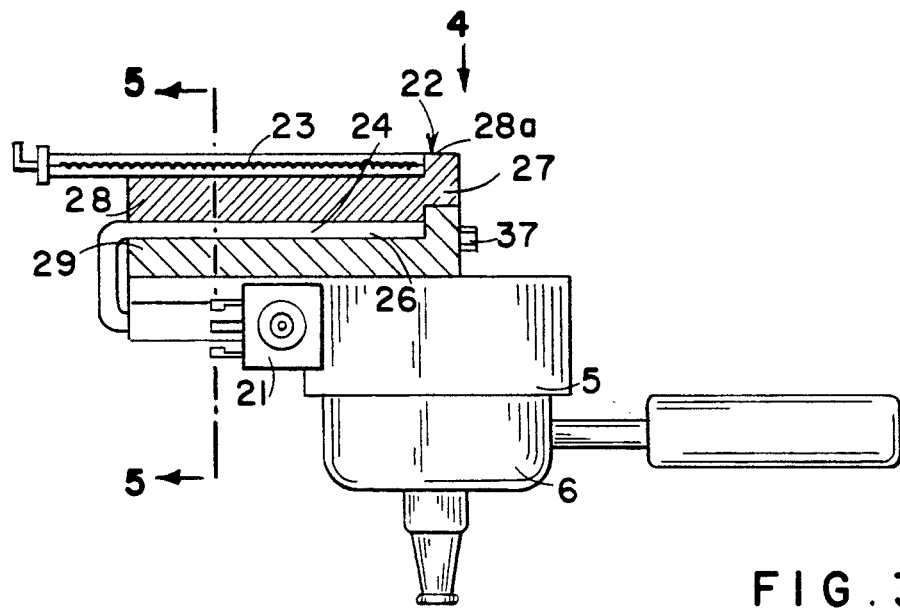
FIG. 3 is a part-sectional, elevation view of a second embodiment of FIG. 2.
Figure 4:
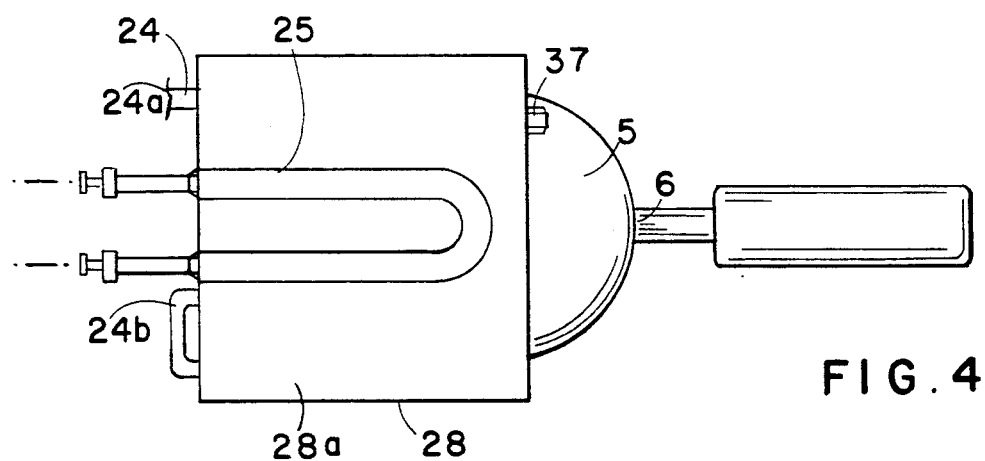
FIG. 4 is a top view of a portion of FIG. 3, in the direction of the arrow 4.
Figure 5:
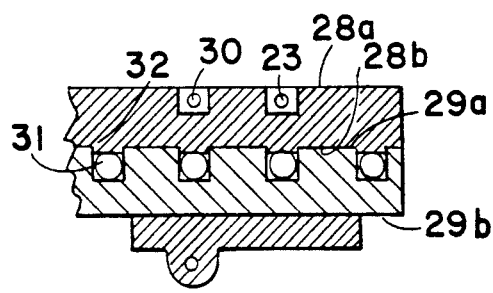
FIG. 5 is a sectional view of a portion of FIG. 3, taken along the line 5—5.
Figure 6:
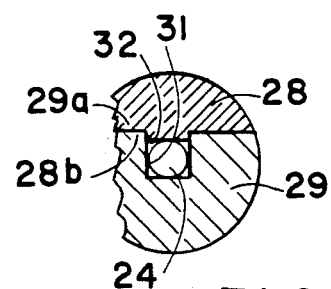
FIG. 6 is an enlarged scale, sectional view of a portion of FIG. 3.

In this second embodiment, as illustrated in FIG. 3, the block 27 comprises an upper plate 28 having a top face 28a and a bottom face 28b, and a lower plate 29 having a top face 29a juxtaposed to the bottom face 28b and a bottom face 29b whereby the block 27 is juxtaposed to the dispensing body 5.

The path 25 for the resistor 23 comprises a channel 30 formed in the upper plate 28, an the top face 28a of the latter, said channel 30 being adapted to accommodate the resistor 23 in a predetermined force fit relationship to be achieved by assembling under a press, for example.

The path 26 for the coil pipe 24 comprises a channel 31 formed in the lower plate 29, on the top face 29a thereof, adapted to accommodate the coil pipe 24. A projection 32 formed on the upper plate 28 at the bottom face 29b of the same interlocks with the channel 31 to produce, on the plates 28 and 29 being juxtaposed, a predetermined force fit of the coil pipe 24.

In operation, each dispensing body 5 becomes operative individually by activation of the resistor 23, solenoid valve 21, and pump 33. With the resistor 21 activated, the optimum temperature is attained accurately for the water by the stepwise control of the power supply to the resistor 23 as the sensed temperature approached the desired value. On reaching the optimum temperature, the machine is ready to dispense coffee. For this purpose, the key 3a is operated in the keyboard 3, thus activating the solenoid valve 21, and after a predetermined time interact to be adjusted at will, preferably in the 3 to 7 seconds range, and reported on the display 4, the pump 33 is activated. During this time interact, the desired percolation through the coffee cake loaded into the percolator holding handle, i.e. wetting of the coffee cake under a low pressure, takes place. With the pump 33 in operation, hot water will flow under a high pressure through the coffee cake to carry the percolation process to completion and result in espresso coffee being dispensed.

Possible deliveries of water and steam from the nozzles would take place from the boiler 15 independently of the espresso coffee being dispensed, without affecting the latter.

A major advantage of the coffee maker of this invention is that it can dispense espresso coffee of superior quality.

A further advantage of the inventive coffee maker is that the quality of the espresso coffee dispensed thereby is kept constant with precision by virtue of the accuracy with which the desired water temperature is attained at all times thanks to the control applied to the power dissipated by the resistor.

Percolation is also carried out in a smooth and constant fashion, as can be ensured by the provision of a pump for each dispensing body.

An additional advantage of the coffee maker according to this invention resides in the simple construction of the heaters, thereby it may be expected that it will operate for a long time without requiring costly servicing.

Also improved is ease of operation, on account of the time when the decalcifying device should be replaced being indicated, by simple and inexpensive means, after a predetermined total amount of water has been used up. It should be noted that this total amount of water is measured in the conduits, and therefore in a direct and accurate manner.

This coffee maker has also proved advantageous from the standpoint of energy consumption, both an account of the highly effective heat transfer from the resistor to the coil pipe in each heater and of the relatively low value of the maximum installed power, as made possible by the power processing logic unit.

Yet another advantage resides in that the dispensing body is under a condition of thermal stability because of the block being juxtaposed to the dispensing body at its bottom face where the coil pipe with the water inlet is located. The resistor, being located remotely therefrom, is kept well away from the dispensing body.

By virtue of that, on operating the keyboard, the resistor is activated at the same time, the sensor response time is suppressed, and the overall espresso coffee delivery time is advantageously shortened. The activation of the resistor by controlled power affords, moreover, gradual and accurate attainment of the desired temperature.

Understandably, the coffee maker described in the foregoing may be altered and modified in several ways by a skilled person in the art to meet specific and contingent requirements, without departing from the scope of this invention as set forth in the appended claims.

I claim:

1. A professional espresso coffee maker for preparation of espresso coffee, cappuccino and the like, comprising:

a plurality of dispensing bodies (5) each adapted to receive a percolator holding handle (6);

a plurality of water heaters (22) each connected to a respective dispensing body (5) for instantaneously heating water supplied thereto and to be supplied from each said heater to a percolator holding handle received in a respective dispensing body;

a plurality of steam and hot water delivery devices (7, 8, 9, 10) for use with said dispensing bodies; and an electronic control apparatus (2) connected to aid heaters for controlling said heater;

each said water heater (22) being mounted to and over a respective dispensing body (5) and comprising a solid block (27) of good heat conductive material, said solid bock comprising an upper plate (28) and a lower plate (27) connected to said upper plate, said upper plate having an upper surface (28a), a first channel (30) defined in said upper surface of said upper plate, a resistor (23) in said channel for heating said solid block, said lower plate having an upper surface (29a), a second channel (31) defined in said upper surface of said lower plate, and a coil pipe (24) for passing water through said water heater in said second channel, said lower plate having a lower surface engaged with said dispensing body.

2. A coffee maker according to claim 1, wherein said upper plate has a lower surface engaged wit the upper surface of said lower plate, a projection (32) formed on said lower surface of said upper plate and in interlocked engagement with said second channel 931) for closing said second channel.

3. A coffee maker according to claim 2, wherein said resistor (23) is force fit into said first channel (30) and said coil pipe (24) is force fit into said second channel (31).

4. A coffee maker according to claim 1, including a temperature sensors, (37) connected to each solid block (27) for sensing a temperature of water in said coil pipe, a storage and comparator unit (39) in said electronic control apparatus (22), said temperature sensor being connected to said storage and comparator unit for supplying a signal to said storage and comparator unit corresponding to a temperature of water in said coil pipe, said storage and comparator unit being set with a plurality of predetermined temperature settings, said electronic control apparatus being connected to said resistor for supplying electric power to said resistor and or reducing electric power supplied to said resistor until the signal corresponding to a temperature of water in said coil pipe corresponds to one of said predetermined temperature settings.

5. A coffee maker according to claim 4, wherein said sensor (37) is mounted to said block (27) adjacent said lower surface (29b) of said lower late which is adjacent said dispensing body.

6. A coffee maker according o claim 4, including AND-logic unit (41) in said electronic control apparatus (2) connected to said resistor for activating said resistor, and a keyboard (3) connected to said AND-logic unit, said keyboard being operable to operate said AND-logic unit to activate said resistor.

7. A coffee maker according to claim 6, wherein said storage and comparator unit controls the supply of power to said resistor are when said resistors activated at one of said settings.

8. A professional espresso coffee maker for preparation of espresso coffee, cappuccino and the like, comprising:
   a plurality of dispensing bodies (5) each adapted to receive a percolator holding handle (6);
   a plurality of water heater (22) each connected to a respective dispensing body (5) for instantaneously heating water supplied thereto and to be supplied from each said heater to a percolator holding handle received in a respective dispensing body;
   a plurality of steam and hot water delivery devices (7, 8, 9, 10) for use with said dispensing bodies; and
   an electronic control apparatus (2) connected to said heater for controlling said heater;
   a supply boiler (15) for supplying steam and hot water to said delivery devices (7, 8, 9, 10);
   a common water supply line (12);
   a boiler conduit (16) connected between said supply line and said supply boiler for supplying water to said supply boiler;
   a plurality of dispensing body conduit (20) connected to said boiler conduit and each hot water heater for supplying water to each hot water heater;
   a pump (17) connected in said boiler conduit for pumping water from said supply line to said supply boiler; and
   a pump (33) connected in each dispenser body conduit for pumping water from said supply line to each dispensing body.

9. A coffee maker according to claim 8, including a meter (18, 34) in said boiler and each of said dispensing body conduits for issuing pulses which are proportional in number to an amount of water flowing through said meter, a pulse counter unit (36) in said electronic control apparatus (2) and connected to said meters for counting pulses form said meters for determining an amount of water supplied to said boiler and to said dispensing bodies.

* * * * *